United States Patent
Nodzak et al.

(10) Patent No.: US 12,052,146 B2
(45) Date of Patent: Jul. 30, 2024

(54) MACHINE LEARNING-BASED MULTITENANT SERVER APPLICATION DEPENDENCY MAPPING SYSTEM

(71) Applicant: Bank of America Corporation, Charlotte, NC (US)

(72) Inventors: Conor Mitchell Liam Nodzak, Charlotte, NC (US); Fernando Maisonett, Charlotte, NC (US); Shreyas Srinivas, Charlotte, NC (US); Brian Busch, Charlotte, NC (US); Kyle Scott Sorensen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 49 days.

(21) Appl. No.: 18/061,834

(22) Filed: Dec. 5, 2022

(65) Prior Publication Data
US 2024/0187311 A1    Jun. 6, 2024

(51) Int. Cl.
| | | |
|---|---|---|
| H04L 12/00 | (2006.01) | |
| H04L 41/0681 | (2022.01) | |
| H04L 41/14 | (2022.01) | |
| H04L 41/16 | (2022.01) | |

(52) U.S. Cl.
CPC .......... *H04L 41/16* (2013.01); *H04L 41/0681* (2013.01); *H04L 41/145* (2013.01)

(58) Field of Classification Search
CPC ... H04L 410/16; H04L 41/14; H04L 41/0681; H04L 41/145
USPC ........................................ 709/223, 224, 225
See application file for complete search history.

(56) References Cited

U.S. PATENT DOCUMENTS

| | | |
|---|---|---|
| 9,197,644 B1 | 11/2015 | Sherman et al. |
| 9,578,009 B2 | 2/2017 | Hopkins et al. |
| 10,027,716 B2 | 7/2018 | Watson et al. |
| 11,094,023 B2 | 8/2021 | Coronel et al. |
| 11,201,915 B1 | 12/2021 | Mesard et al. |
| 11,715,111 B2 * | 8/2023 | Teo ...................... G06Q 30/016 705/304 |
| 2012/0096521 A1 | 4/2012 | Peddada |
| 2012/0150912 A1 | 6/2012 | Ripberger |
| 2013/0007891 A1 | 1/2013 | Mogaki |

(Continued)

*Primary Examiner* — Frantz Coby
(74) *Attorney, Agent, or Firm* — Banner & Witcoff, Ltd.

(57) ABSTRACT

A multitenant server application dependency mapping system maps data flows through multitenant infrastructure components through the use of a machine learning model framework that continually learns data flow patterns across the enterprise network and predicts the state of any given server. The multitenant server application dependency mapping system treats the network architecture as a whole and collects data accordingly, and uses that data to compute state probabilities conditioned upon both a point in time (and the observed prior states retrieved from the historical telemetry data. This provides a way to predict the likelihood of observing a tenant state being occupied, while also accounting for variations among the activity levels of various application. To forecast future states of all infrastructure components, the transition probabilities from tenant state to tenant state are then computed through time and used as inputs to the model to provide an accurate reconstruction of the data flows through all multitenant infrastructure components.

20 Claims, 7 Drawing Sheets

(56) References Cited

U.S. PATENT DOCUMENTS

2014/0244585 A1    8/2014   Sivasubramanian et al.
2016/0099915 A1    4/2016   Savelieva et al.
2021/0133346 A1*   5/2021   Alsharif ................ G06F 16/906

* cited by examiner

| | 422 | 424 | 426 | 432 | ... | 438 | 442 | 452 | ... | 458 | 462 | ... | 468 | 472 | ... | 478 |
|---|---|---|---|---|---|---|---|---|---|---|---|---|---|---|---|---|
| 422 | | | | | | | | | | | | | | | | |
| 424 | 99% | | | | | | | | | | | | | | | |
| 426 | | 85% | | | | | | | | | | | | | | |
| 432 | | | 100% | | | | | | | | | | | | | |
| ... | | | | 100% | | | | | | | | | | | | |
| 438 | | | | | | 98% | | | | | | | | | | |
| 442 | | | | | | | | | | | | | | | | |
| 452 | | | | | | | | | | | | | | | | |
| ... | | 2% | | | | | | | | | | | | | | |
| 458 | | | | | | | | | | | | | | | | |
| 462 | | | | | | | | | | | | | | | | |
| ... | | | | | | 25% | | | | | | | | | | |
| 468 | | | | | | | | | | | 92% | | 17% | | | |
| 472 | | | | | | | | | | | 14% | | 99% | | | |
| ... | | | | | | | | | | | | | | | | |
| 478 | | | | | | | | | | | | | | | | |

FIG. 6

MACHINE LEARNING-BASED MULTITENANT SERVER APPLICATION DEPENDENCY MAPPING SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization.

To monitor data flows on an enterprise network, an enterprise organization must satisfactorily maintain a map of application dependencies and capture data flows with respect to their timing, frequency, volume and direction. When done at scale, the task has recently been addressed with a combination of embedded sensors on the network that track the routing of telemetry data and a system of record that serves as a reference to identify the application infrastructure involved in the transmission of data. To produce accurate reporting, an unambiguous alignment is needed between the infrastructure component and a unique tenant application that manages the flow of data through the component. However, this requirement has been shown to not be satisfied when applied to all components of real-world architectures used by many modern businesses. For example, due to cost saving benefits and/or resource capacity optimization, network infrastructure may have multi-tenant servers that are occupied by more than one tenant application. In such cases, current methods fail to resolve problems with identification of which tenant application was involved in a given data flow through any infrastructure component. Thus, a reduction in the overall effectiveness and accuracy in coverage of data flow monitoring because, due to these issues, the multitenant servers must be omitted and that results in an increase in risk of unauthorized data use and/or unallowed cross-border data communication.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification and prediction of application dependencies and data flow of network architecture components including multi-tenant servers.

Aspects of the disclosure relate to computer hardware and software. In particular, one or more aspects of the disclosure generally relate to computer hardware and software for data flow analysis, and more specifically to a machine-learning based analysis system to identify and/or predict data flow associated with a network comprising, at least partially, multi-tenant server based applications.

A machine-learning based multitenant server application dependency mapping system may address the problem of how to accurately map data flows through multitenant infrastructure components through the use of a machine learning model framework that continually learns data flow patterns across the enterprise network and predicts the state of any given server. To do so, the multitenant server application dependency mapping system treats the network architecture as a whole, where each server may occupy one or more possible states that are given by the primary/tenant application(s) as referenced to identifiers and maintained in the system of record. The multitenant server application dependency mapping system may then compute the state probabilities conditioned upon both a point in time (e.g., time of day and/or day of week, month, and the like) and the observed prior states retrieved from the historical telemetry data. This provides a way to predict the likelihood of observing a tenant state being occupied, while also accounting for variations (e.g., based on time of day, day of week, and/or the like) among the activity levels of various application. To forecast future states of all infrastructure components, the transition probabilities from tenant state to tenant state are then computed through time and used as inputs to the model. The model is then used to predict the next set of tenant states, such as via a maximum likelihood estimation. In doing so, multitenant server application dependency mapping system solves the problem of accurate reconstruction of the data flows through all multitenant infrastructure components by treating the state model as a network link prediction problem over a dynamic graph of data movement between network infrastructure components. As such, the multitenant server application dependency mapping system uses machine learning to perform dependency mapping based on multitenant and single tenant server data flow analysis, along with temporal graph link prediction models.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Figure 1A:
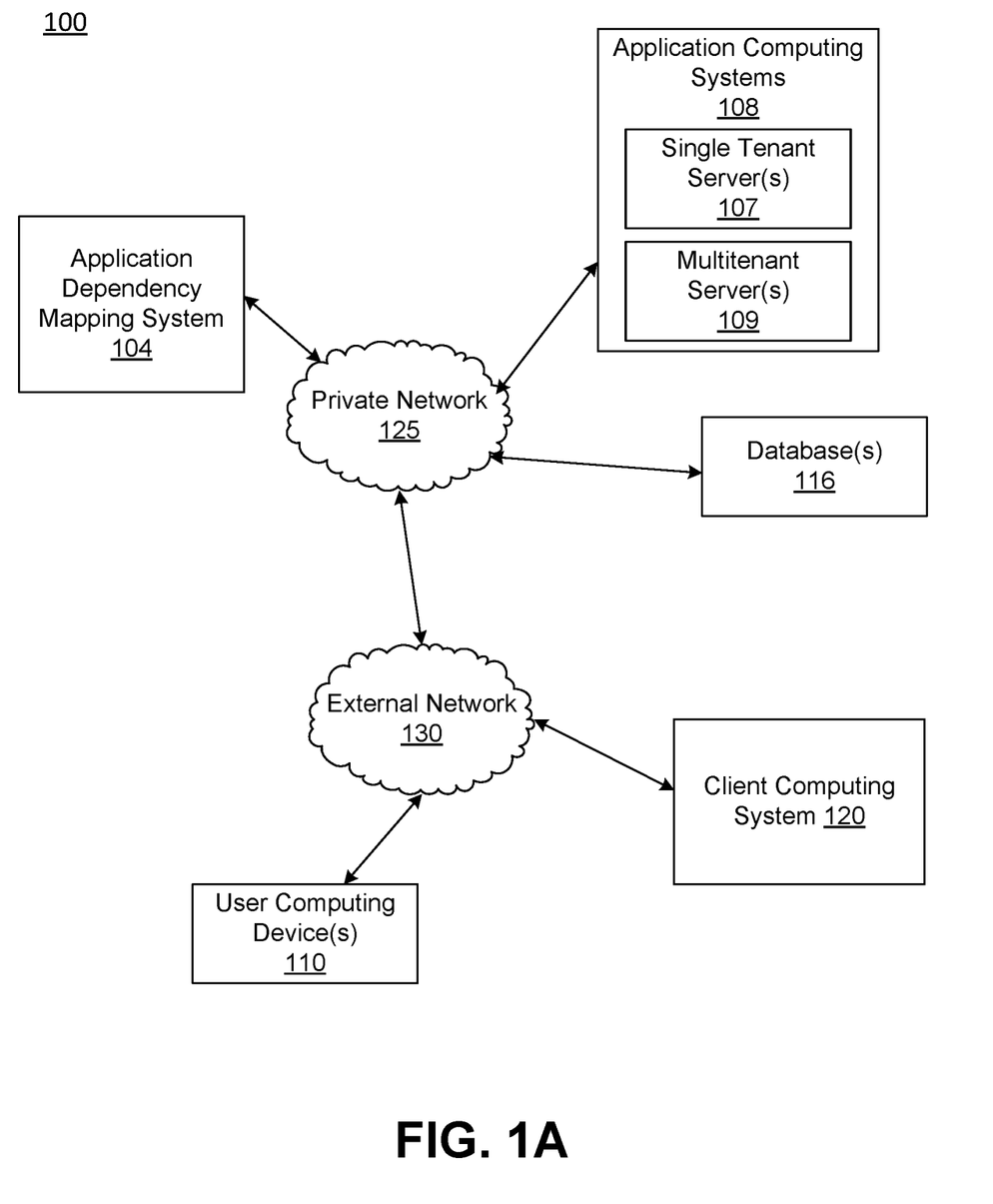
FIG. 1A shows an illustrative computing environment for machine learning-based dependency mapping of applications on a network including multitenant servers, in accordance with one or more aspects described herein.

FIG. 1A shows an illustrative computing environment 100 for machine learning-based dependency mapping of applications on a network including multitenant servers, in accordance with one or more arrangements. The computing environment 100 may comprise one or more devices (e.g., computer systems, communication devices, and the like). The computing environment 100 may comprise, for example, an application dependency mapping system 104, one or more application computing system 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise at least one client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the application dependency mapping system 104 as being a separate computing system, the application dependency mapping system 104 may be incorporated within one or more different computing systems, such as a server within the application computing systems 108. In some cases, the application dependency mapping system 104 may collect communication data corresponding to communications between application computing systems 108 (e.g., between single tenant servers 107 and/or multitenant servers 109), client computing system(s) 120, and/or user devices 110. The application dependency mapping system 104 may analyze and process the communications data to map data communication flow within the enterprise network and/or where the data communications exit the private network 125, identify a baseline including network communication patterns, and, based on these patterns, identify anomalies or other indicators of unusual or potentially problematic communications, and identify and/or mediate risks that may be indicated by these patterns.

The application dependency mapping system 104 may comprise one or more computing devices and/or other computer components (e.g., processors, memories, communication interfaces) configured to perform one or more functions as described herein, such as and including network monitoring, machine learning model training, storing and/or managing historical communications data, and the like. Further details associated with the architecture of the application dependency mapping system 104 are described with reference to FIG. 1B.

The application computing systems 108 and/or the client computing system(s) 120 may comprise one or more computing devices and/or other computer components (e.g., processors, memories, communication interfaces). In some cases, the applications running on the application computing systems and/or client computing systems 120 may be resident and/or otherwise operate in a single tenant environment (e.g., a single tenant server 107) or a multi-tenant environment (e.g., a multitenant server 109). As the names suggest, operations of a single application, and the application communications, may be associated with a unique computing device (e.g., the single tenant server 107) when the application is installed on the single tenant server 107. A multi-tenant server 109 may have multiple applications resident and operating within them multitenant environment, so that communications to and from the multitenant server may not be easily be attributed to a particular application's operation. In addition, the application computing systems 108 and/or the client computing system(s) 120 may be configured to host, execute, and/or otherwise provide one or more enterprise applications. In some cases, the application computing systems 108 and/or the client computing system(s) 120 may host one or more services configured facilitate operations requested through one or more API calls, such as data retrieval and/or initiating processing of specified functionality. In some cases, the client computing system 120 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The application computing systems 108 and/or the client computing system(s) 120 may comprise various servers and/or databases that store and/or otherwise maintain account information, such as financial account information including account balances, transaction history, account owner information, and/or other information. In addition, the application computing systems 108 and/or the client computing system(s) 120 may process and/or otherwise execute transactions on specific accounts based on commands and/or other information received from other computer systems comprising the computing environment 100. In some cases, one or more of the c application computing systems 108 and/or the client computing system(s) 120 may be configured, for example, to host, execute, and/or otherwise provide one or more transaction processing programs, such as electronic fund transfer applications, online loan processing applications, and/or other programs associated with the financial institution.

The application computing systems 108 and/or the client computing system(s) 120 may be one or more host devices (e.g., a workstation, a server, and the like) or mobile computing devices (e.g., smartphone, tablet). In addition, a device of the application computing systems 108 and/or the client computing system(s) 120 may be linked to and/or operated by a specific enterprise user (who may, for example, be an employee or other affiliate of the enterprise organization) who may have administrative privileges to perform various operations within the private network 125. In some cases, the application computing system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system(s) 120 may comprise one or more computing devices and/or other computer components (e.g., processors, memories, communication interfaces). The client computing system(s) 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system(s) 120 is for processing an electronic exchange of goods and/or services. The client computing system(s) 120 may be associated with a specific goods purchasing activity, such as purchasing a vehicle, transferring title of real estate may perform communicate with one or more other platforms within the client computing system(s) 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the system(s).

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the application dependency mapping system 104, application computing systems 108 and/or the client computing system(s) 120. For example, the database(s) 116 may store historical communications data, model training data, communication pattern information, expected operation pattern information, alert response mechanisms, alert action information, application metadata and the like. In an arrangement, the database(s) 116 may be used for other purposes as described herein. In some cases, the client computing system 120 may write data or read data to the database(s) 116 via the services.

In one or more arrangements, the application dependency mapping system 104, application computing systems 108 and/or the client computing system(s) 120, the user devices 110, and/or the other devices/systems in the computing environment 100 may be any type of computing device capable of receiving input via a user interface, and communicating the received input to one or more other computing devices in the computing environment 100. For example, the application dependency mapping system 104, application computing systems 108 and/or the client computing system(s) 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the application dependency mapping system 104, application computing systems 108 and/or the client computing system(s) 120, the user devices 110, and/or the other devices/systems in the computing environment 100 may, in some instances, be and/or comprise special-purpose computing devices configured to perform specific functions.

Figure 1B:
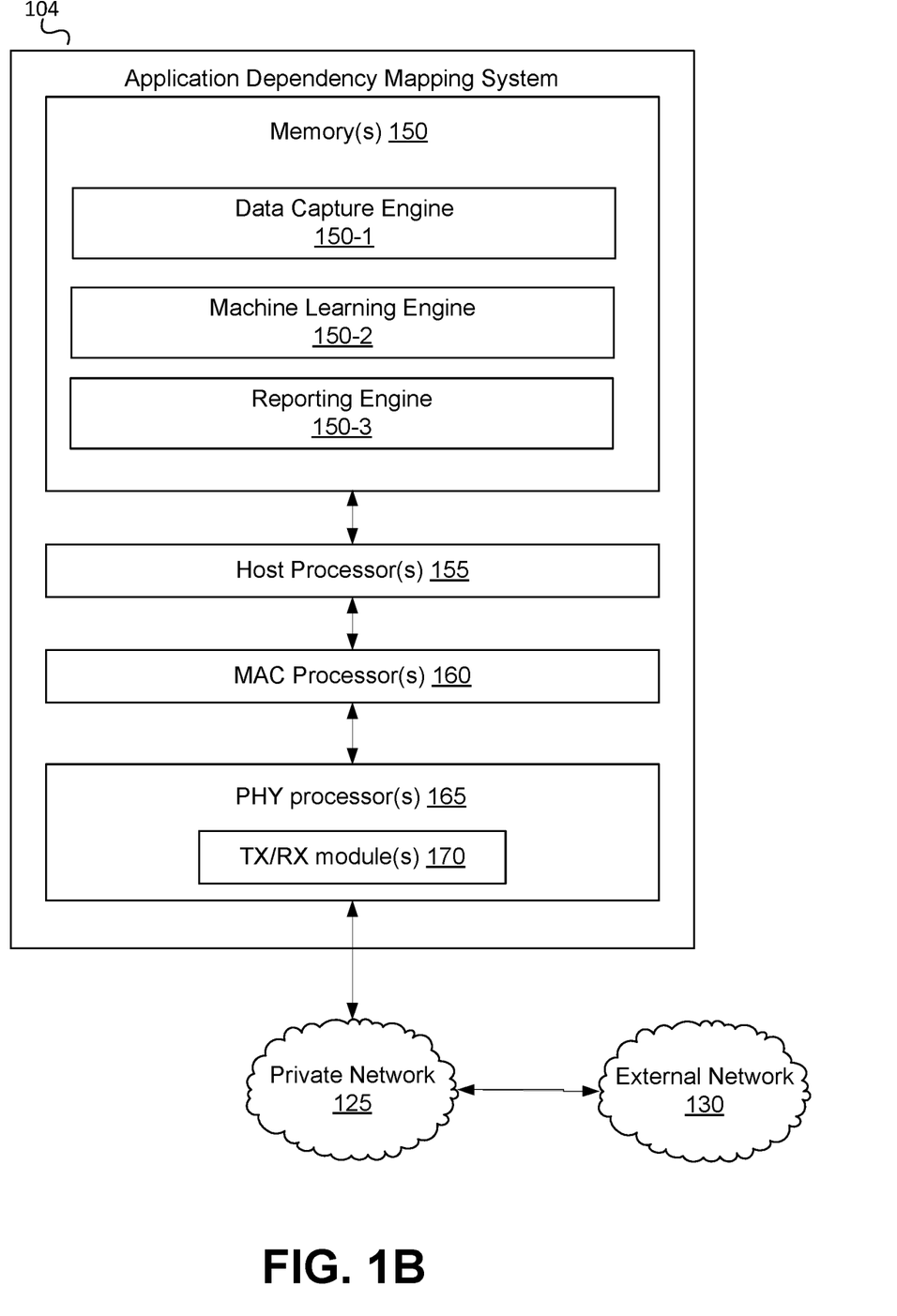
FIG. 1B shows an illustrative computing platform enabled for machine learning-based dependency mapping of applications on a network including multitenant servers, in accordance with one or more aspects described herein.

FIG. 1B shows an illustrative the application dependency mapping system 104 in accordance with one or more examples described herein. The application dependency mapping system 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The application dependency mapping system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the application dependency mapping system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 130. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the application dependency mapping system 104 may be configured to execute machine readable instructions stored in memory 150. The memory 150 may comprise (i) one or more program modules/engines having instructions that when executed by the one or more processors cause the application dependency mapping system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the application dependency mapping system 104 and/or by different computing devices that may form and/or otherwise make up the application dependency mapping system 104.

For example, the memory 150 may have, store, and/or comprise a data capture engine 150-1, a machine learning engine 150-2, a reporting engine 150-3 and/or the like. The data capture engine 150-1 may have instructions that direct and/or cause the application dependency mapping system 104 to perform one or more operations associated with monitoring communications between applications over the enterprise network, capturing data associated with the communications including directionality, time of day, day of week, month and/or year, an amount of data transferred, assemble input data for the machine learning engine processing, and the like. The machine learning engine 150-2 may have instructions that may cause the application dependency mapping system 104 to train a machine learning model based on historical captured data communications information, continuously train the model based on current information, and/or train the model based on configuration files, and the like, process communications input information by the trained model to identify communications patterns via applications, identify a likelihood that particular communications to and/or from multitenant devices are directed to and/or from particular applications hosted on the multitenant devices, and the like. The reporting engine 150-3 may have instructions that may cause the application dependency mapping system 104 to automatically identify an indication of unusual data activity on the computing network based on the communications information, generate a report and/or trigger an action to resolve the unusual activity, generate a notification providing details of the unusual activity, and the like.

While FIG. 1A illustrates the application dependency mapping system 104, the client computing systems 120, and/or the application computing systems 108, as being separate elements connected in the private network 125, in one or more other arrangements, functions of one or more of the above may be integrated in a single device/network of devices. For example, elements in the application dependency mapping system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the client computing systems 120, and/or the application computing systems 108.

Figure 2:
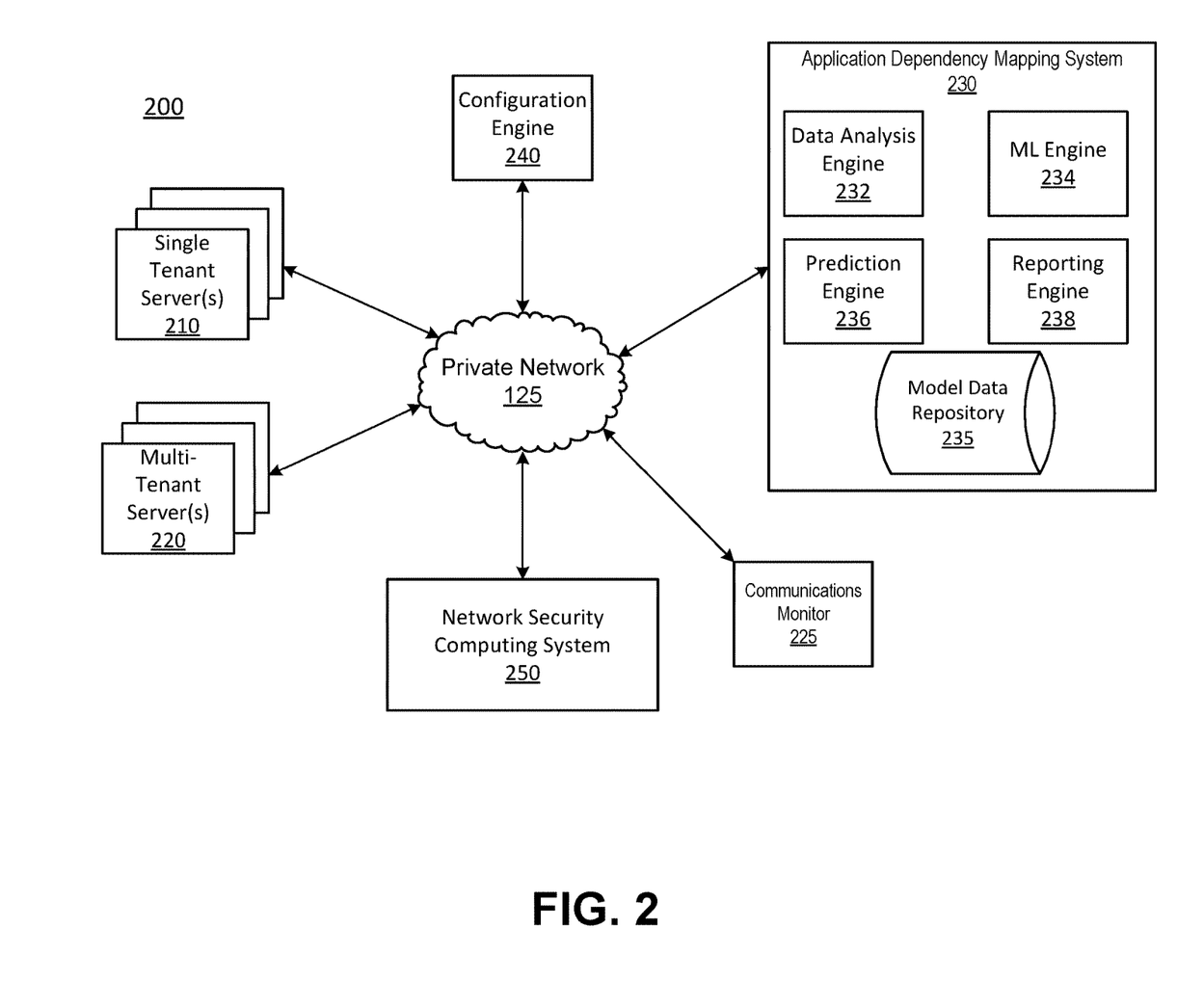
FIG. 2 shows illustrative dependency mapping platform on a network having single tenant based applications and multitenant based applications in accordance with one or more aspects described herein.

FIG. 2 shows illustrative dependency mapping platform operational within an enterprise network 200 having single tenant based applications and multitenant based applications in accordance with one or more aspects described herein. The enterprise network 200 may include one or more single tenant servers 210 on which an application is running and one or more multitenant servers 220 upon which two or more applications are running. The single tenant servers 210 and the multitenant servers 220 are communicatively coupled to the private network 125 to provide products and/or services to users, where communications between application may be monitored by a communications monitor 225. The communications monitor 225 may include telemetry sensors to capture communications information including directionality information, source device information, destination device information, source application information, destination application information, time of day information, day of week/month/year information, data packet size information, and the like.

Figure 5A:
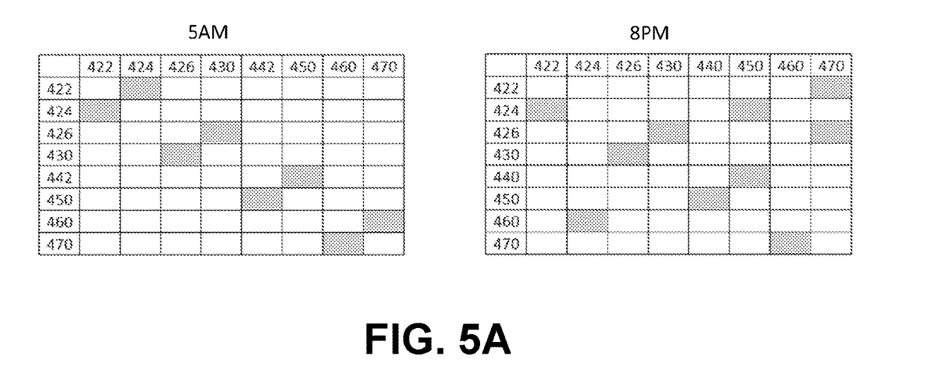
FIGS. 5A-5C show illustrative data captured by a computing platform enabled for machine learning-based dependency mapping of applications according to aspects described herein.
Figure 5B:
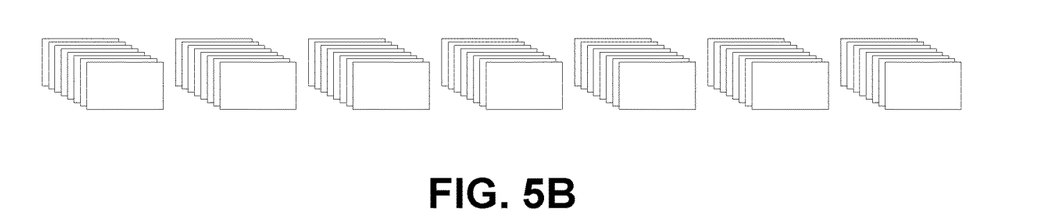
Figure 5C:
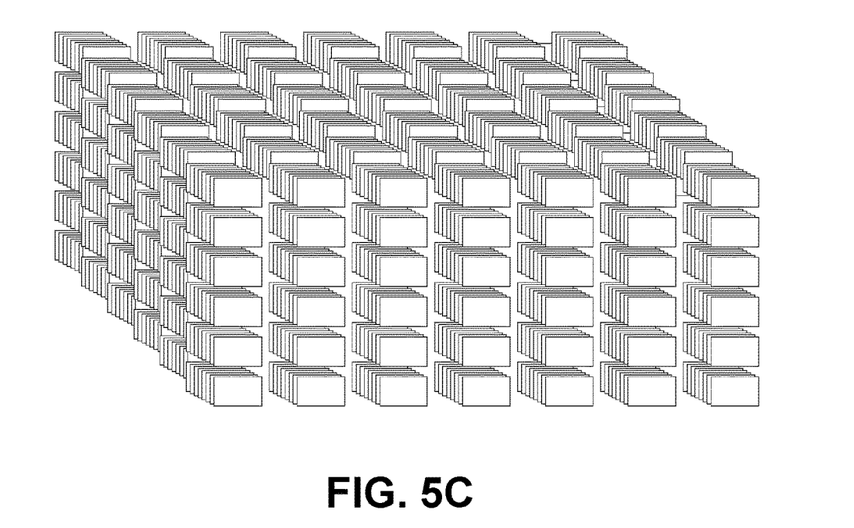
Figure 6:
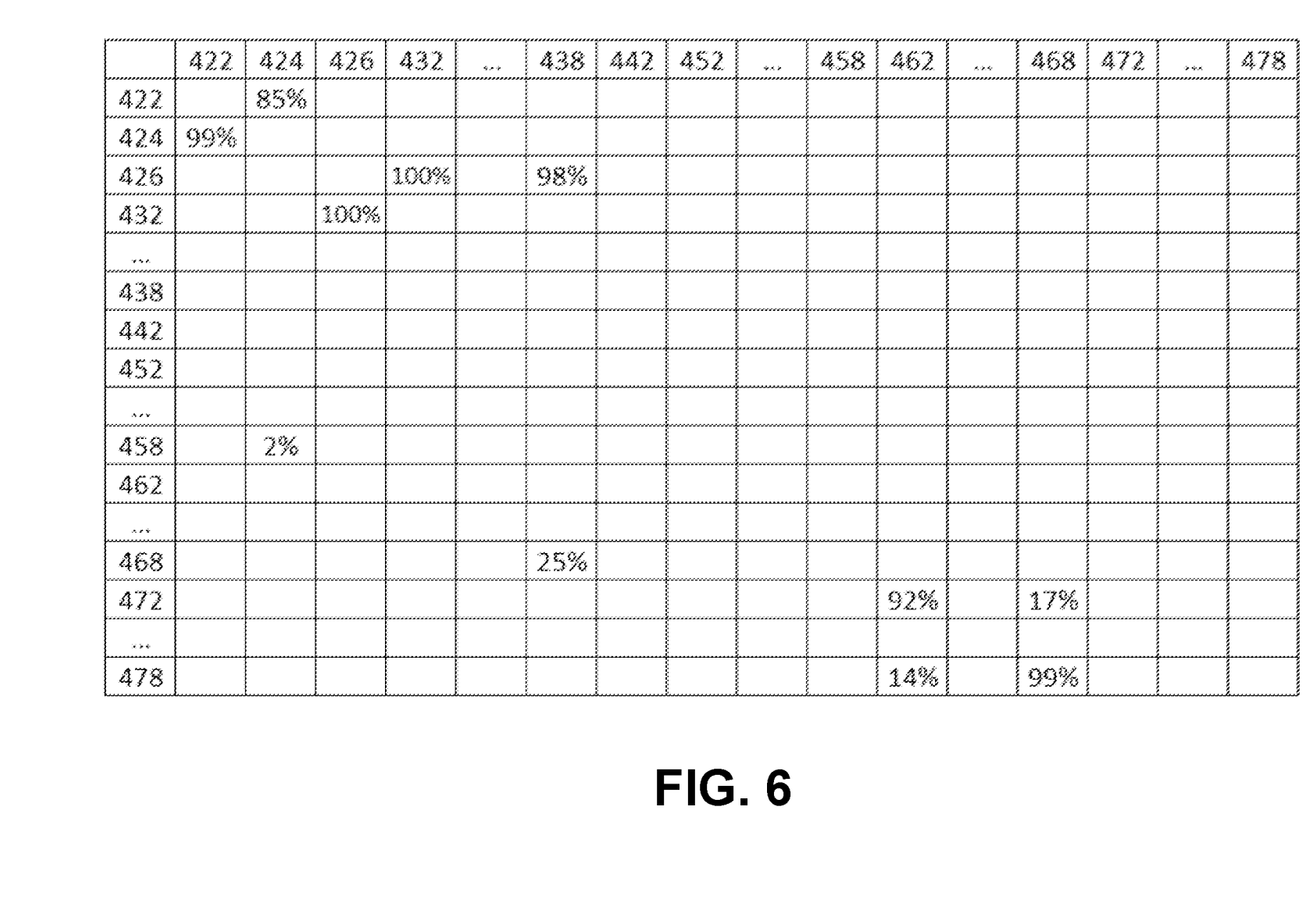
FIG. 6 shows illustrative predicted likelihoods of dependency mapping of communications between applications according to aspects described herein.

The communications monitor 225 may communication the captured information to the application dependency mapping system 230, which may include a data analysis engine 232, a machine learning engine 234, a prediction engine 236, a reporting engine 238, and a model data repository 235. The data analysis engine 232 may process communications information received from the monitor 250 to format input information for the ML model processed by the ML engine 234. Illustrative examples of the input information are shown in FIGS. 5A-5C and output from the model of the ML engine is shown in FIG. 6. The input data may be stored in the model data repository 235, including directionality information, communications metadata information, application information, and the like. In some cases, the model data repository 235 may store information used by a prediction engine 236 and/or a reporting engine 238 including policy information, regulatory information, and/or other rules that may be applied to the identified communications assigned to particular multitenant resident applications, such as a likelihood to which application communications may be sourced and/or received. Additionally, the model data repository 235 may store configuration information received from a configuration engine 240. This information may correspond to user provided input, and or automatically generated information provided by an application. For example, the configuration engine may allow a user, or computing device, to provide information as to which applications are resident upon multitenant servers 220 and information capable of allowing the ML engine to identify when particular communications may be expected to be received or sent by the multitenant server resident applications. In some cases, the model data repository 235 may be a big data repository or other repository capable of storing and facilitating analysis of huge amounts of data.

The prediction engine 236 may process model output received from the ML engine 234 to predict a likelihood of when communications may likely be directed to particular resident applications of the multitenant servers 220. In some cases, predictions may be made for all applications, even those resident upon the single tenant servers 210, where communications directed to applications resident upon the single tenant servers 210 are given a likelihood index of 100% (e.g., normalized to 1, or another value). Additionally, for applications for which configuration information was received, communications directed to associated multitenant server(s) 220 may also be given a likelihood index of nearly 100 or other high probability value (or normalized to 1), when certain configured characteristics of the communications are met (e.g., time of day, data size, data format, source or recipient application information, and/or the like). For other multitenant applications, the likelihood of which applications are likely a source application or destination application of messages during a particular time period for multitenant servers, may be identified via pattern recognition capabilities of the prediction engine, and the like. The reporting engine 238 may format and send reports summarizing application computing patterns to one or more external systems (e.g., a network security computing system 250, an information technology infrastructure management computing system, and the like). These reports may provide insight into the health of the enterprise network and/or risk to network security and/or other data security risks to the enterprise network. In some cases, the reporting engine 238 may trigger a response action by another network, such as by triggering a quarantine action for a particular server (e.g., multitenant server, single tenant server, and the like) when an anomaly to normal data patterns are identified, such as when an application hosted by a multitenant server may have communications that imply a potential data breach, improper data action (e.g., a cross border data communication), and/or the like.

In some cases, the single tenant servers 210 and the multitenant servers 220 may each host applications, where each application may be hosted by multiple servers. In some cases, an application may be hosted on both single tenant servers and multitenant servers. For example, an application may be hosted by 3 servers, two of which are single tenant servers 210 and a portion of the application is hosted on a multitenant server 220 that may also host other applications. As such, analysis of communications directed to the application and/or sent by the application may be difficult to analyze. For example, an application communicating between single tenant servers (e.g., application 422 and application 424 of FIG. 4) may be a direct connection and may be easy to analyze and determine which applications are communicated at that point in time based on captured telemetry data. More difficult identification of the applications involved may occur during the case of a single tenant server based application communicating to an application hosted on a multitenant server, such as application 426 to multitenant server 430 of FIG. 4. Here, the application 426 may be communicating to one of multiple applications 432-438 hosted by the multitenant server. To the data capture engine and/or the telemetry devices capturing data, each multitenant server (e.g., multitenant server 430, 450, 460, and 470) may appear to be a closed box, where a connection to the server can be identified, but not which application is the ultimate destination for that message. In some cases, the model may be used to analyze information corresponding to single tenant to single tenant application communications (e.g., Application A to Application B) to infer a likelihood that a same application connection (Application A to Application B) is occurring at a same or similar time of day or day of week. For example, if both application 422 and 426 correspond to instances of a same application and applications 424 and 432 also correspond to same applications, the trained model may infer that similar communication patterns between applications 422 and application 424 and applications 426 and 432 may also be the same. As such, communication patterns between application 426 and multitenant server 430 that match or are similar to communication patterns between application 422 and 424, may allow the ML engine 234 to infer that these correspond to that matched pattern correspond to an identification that application 236 is communicating to application 432 at that time, as opposed to a different application on the multitenant server (e.g., application 438).

These patterns may be time dependent because application communications may differ based on a time of day and/or day of week due to multiple network conditions and/or activities that may occur at different times. For example, customer centric applications may communication during a business day, but the same applications may communicate to other applications (e.g., data backup applications, security scan applications, and the like) during non-business hours or at times when network activity is less. To allow for the ML model to work correctly, input data may be enriched to enhance the inference capabilities of the model. In some cases, the telemetry data may be enriched with configuration information, where applications and/or humans may enter application connectivity information. For example, the configuration engine 240 may present a user interface at a user device to allow a user to provide application connectivity information such as entering information that identifies that application 422 and application 432 communicate and/or provide timing information about when that communication occurs (e.g., backup application occurs between the hours of 10 PM and 1 AM, virus scan application communication occur at 12 PM each day) and/or a customer identification application may interface with a customer account management application more often between the hours of 6 AM and 8 PM. These connections may never be identified based on telemetry data received from network sensors, but the configuration information may allow the model to be properly trained to make inferences within the model. Additional data sources may also be used to identify and/or verify strong connections. Such data may add layers of data to make better inferences on what is happening within the multi-tenant infrastructure.

Figure 3:
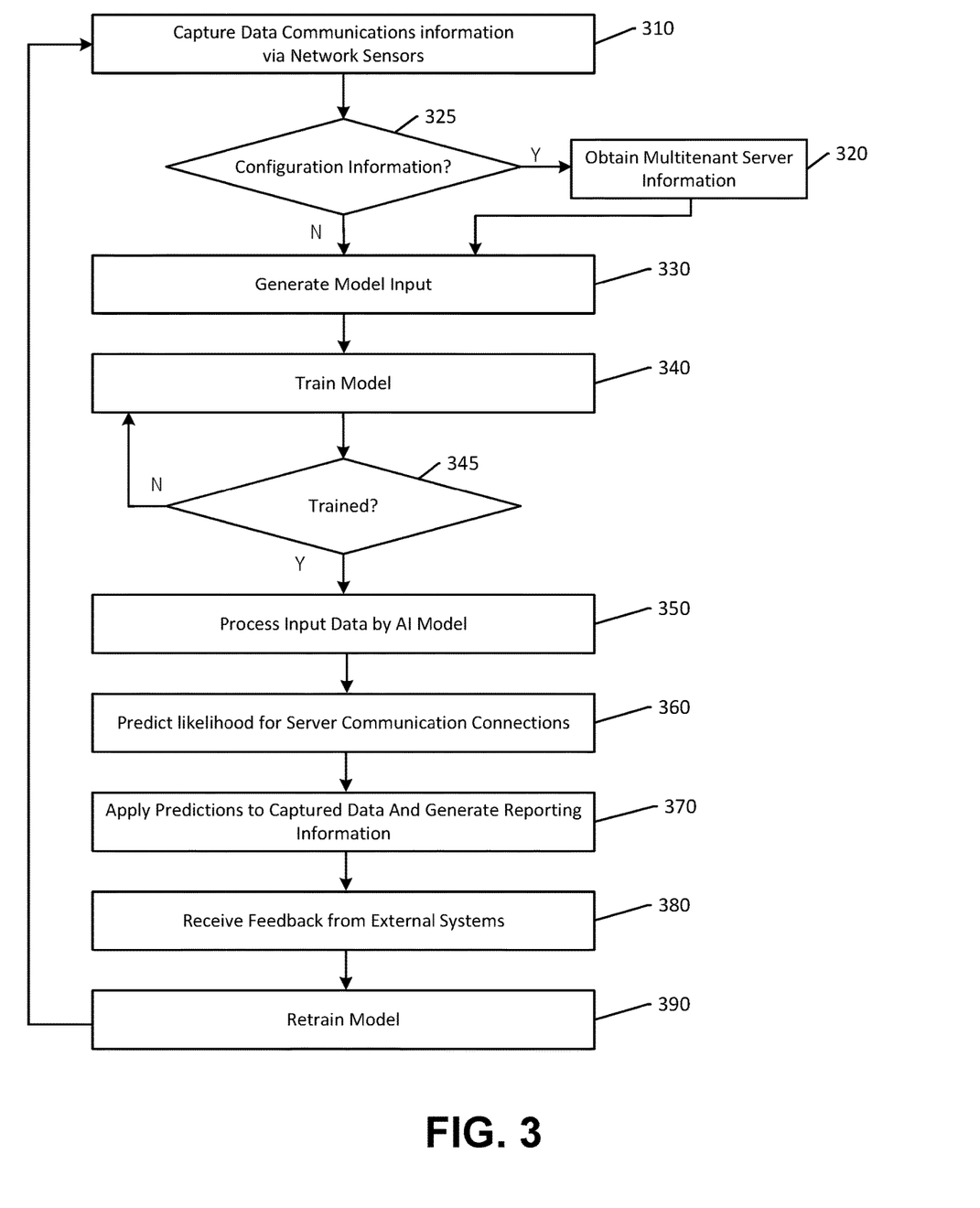
FIG. 3 show an illustrative process for dependency mapping of applications on a network including multitenant servers, in accordance with one or more example arrangements.

FIG. 3 show an illustrative process for dependency mapping of applications on a network including multitenant servers, in accordance with one or more example arrangements. At 310, telemetry sensors (e.g., the communications monitor 225) may capture telemetry information corresponding to communications between applications on the network. At 325, configuration information may also be loaded where if configuration information for application to application communication has been provided, the application dependency mapping system may load or solicit the configuration information via the configuration engine 240. At 330, the data analysis engine 232 may assemble and format communication information and configuration information into an input data format for processing by the ML model. At 340, the model may be continually trained, input data may include both historical information and/or feedback information to ensure that data movements may be attributed to correct applications hosted by multitenant servers. This process may continue at 345, until the ML engine 234 indicates the training process has completed. At 350, the ML engine 234 may process the input information to make inferences about communications of each application hosted by the multitenant servers 220. At 360, the prediction engine 236 may analyze the output of ML engine 234 that identifies likelihood of which applications are communicating for particular points in time (e.g., an hour of a particular day).

At 370, the application dependency mapping system 230 may apply the predictions to the captured communications information to generate reporting information about application connectivity at particular points in time. Here, the application dependency mapping system 230 may trigger a response to be performed based on, for example, identification of suspect data movement. In some cases, this identification may include unexpected application connectivity (e.g., an indication of malware activity or a malicious user), cross border communications (e.g., connection of applications in unallowed regions), and/or the like. The application dependency mapping system 230 may receive feedback about the identified application connectivity information from external systems at 380, were the model operation and/or generation of input data may be improved based on the feedback. Feedback may include an indication of wrong application connectivity information, an indication of a successful identification or the like. At 390, the historical feedback may be used to retrain the model.

Figure 4:
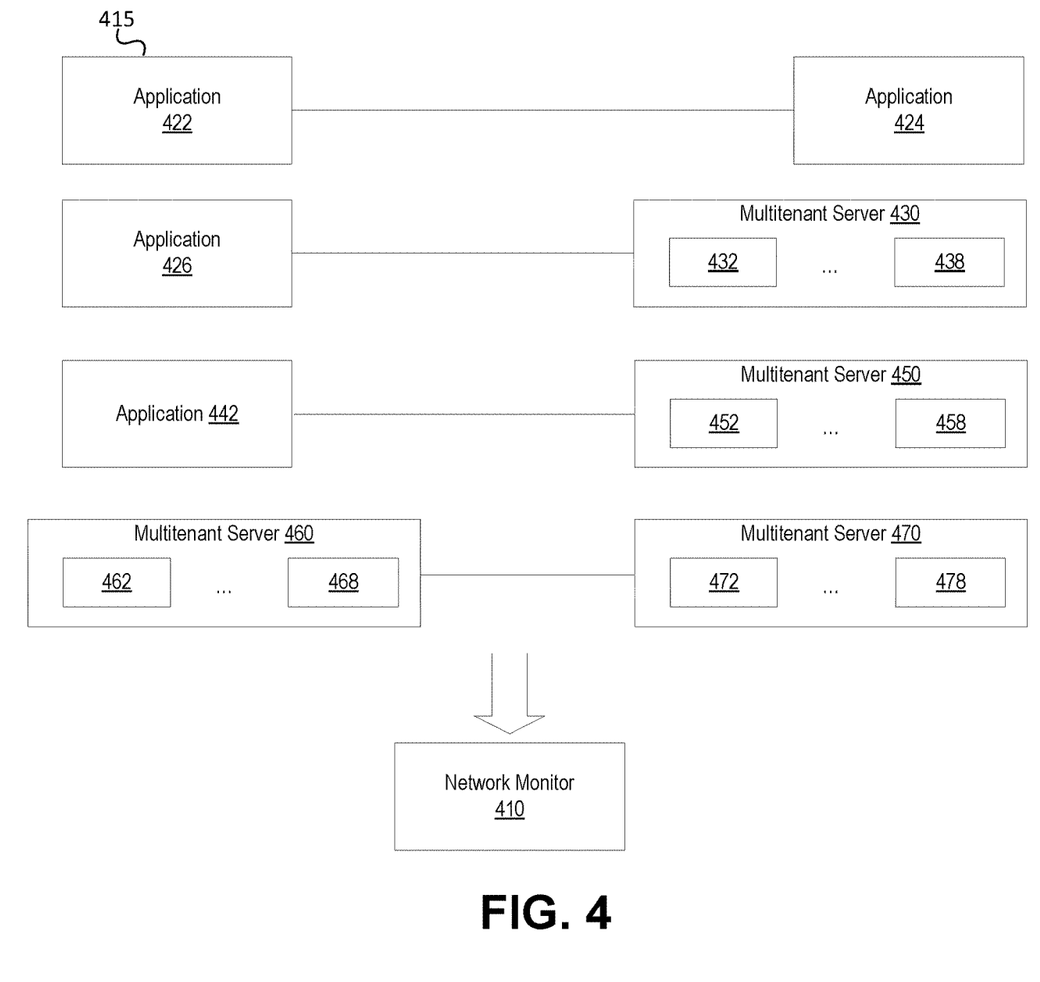
FIG. 4 shows an illustrative example monitoring of application communications of applications from single tenant servers and multitenant servers in accordance with one or more aspects described herein.

FIG. 4 shows an illustrative example of a network communications monitor 410 (e.g., communication telemetry sensors, and the like) performing monitoring activities to capture communications between applications from single tenant servers and multitenant servers in accordance with one or more aspects described herein. In some cases, evidence-based data mapping activities may be performed to analyze networked communications on an enterprise network to understand data movement in terms how applications (e.g., application 422, application 432, application 452, and the like) and servers (e.g., single tenant server 415, multitenant server 430, and the like) within the enterprise network communicate with each other, identify when this communication occurs and a frequency of these communications (e.g., for sent and/or received messages), identify a volume of information sent between the applications, and the like. Telemetry data, such as that captured by the network communications monitor 410 may be leveraged for mapping activities of these communications that occur between the various applications operating on the enterprise network (e.g., performing security activities, providing products and/or services to users, and the like).

The application dependency mapping system 230 may correlate the captured communication information, with other metadata that exists within the computing system (e.g., application identifiers, application type, expected communication types, expected times for communications, schedules for data transfers and/or backups, and the like) to identify and map the communications captured in the telemetry data back to particular infrastructure components and/or systems (e.g., servers, hosts, sub-networks, and the like) within the enterprise network. These mappings then may be communicated to external systems to trigger other activities, such as to trigger an alert response such as in response to a potential malicious activity (e.g., a data breach), trigger a failover process to initiate backup operations when a server fails or is likely to fail, trigger a reporting action for additional monitoring an analysis such as for unusual or unexpected activities. These actions may be initiated based on an understanding of normal and/or expected data movements and a capability to identify deviations from the normal and/or expected patterns of activity.

For example, the application dependency mapping system 230 may have the ability to aggregate data on a periodic basis (e.g., an hourly basis) that allows for capturing large amounts of data that can be analyzed for trends and patterns of behavior (both normal patterns and unusual patterns) over long period of time. Such trends and patterns may use time series analysis methodologies to identify whether a trend indicates a potential for abnormal activity to occur in the future (e.g., a pattern that indicates a hardware device may be failing) and/or whether abnormal activity is occurring (e.g., a data breach, malware activity, and/or the like) because information exists and has been analyzed by a machine learning model, where the machine learning model is continually trained on the present and historical information to identify known communications behavior between applications and/or learn normal activity patterns, such as for newly implemented, updated and/updated hardware and/or software components associated with the applications.

The machine learning model can be trained to identify normal activity patterns and to identify an indicator for potential for abnormal activity and may flag this indicator as potential indicators of data corruption. Such indications may then be used to trigger an appropriate response (e.g., a failover response, a quarantine response, and/or the like) to be applied to particular applications and/or servers affected by the potential data corruption. In doing so, the application dependency mapping system 230 provides messages and alerts that increase an understanding of where data is moving within the network and whether that activity should be permitted (e.g., data movements across borders or regions and identifying whether that data movement is a permitted activity). This capability allows the application dependency mapping system 230 to also supply various stakeholders, e.g., via the reporting engine 236, information to help regulate and/or enforce controls on how data and where data moves within the enterprise network. The application dependency mapping system 230 is capable of identifying actions and or activity that is representative of an incident, or an indication or probability (e.g., likelihood) that an incident may be imminent, and tracking and understanding when data was last sent to a particular application. For example, the application dependency mapping system 230 may be able to identify and when data was expected to be sent between application, including an expected amount of data, and if the application dependency mapping system 230 identifies a huge spike in volume, the application dependency mapping system 230 may trigger a proactive response and automatically send communications that provide insights about the incident or potential incident, how the system has triggered actions to resolve the incident, and actions triggered to restore the system and/or to find a root cause of the incident.

FIGS. 5A-5C show illustrative data captured by a computing platform enabled for machine learning-based dependency mapping of applications according to aspects described herein. The ML model is being used to solve a problem of identifying which application are involved during identified instances application to application communications at particular points in time. Such information may be difficult to obtain when the source application and/or the destination application is obscured due to multiple applications being active on multitenant servers. Single tenant server based application communications may be easy to identify, since communications to these servers can confidently be attributed to whichever application is resident on the involved servers. Here, patterns may be identified over some historical window to correlate definitive mappings to particular application to application connections, along with a cadence (e.g., timing, duration, data size, and the like) of those communications.

This information provides the involved applications and solves downstream reporting issues with normal patterns, where abnormal activities may be identified as potential deviations from the normal activity patterns. As such, the system can automatically identify sources and destinations for data movement across the enterprise network. The model may be built off of the definitive mappings, such as by using a supervised approach, to collect the input data and train the model regarding expected application communication behavior. The model may be used to draw out which application may be most likely to be communicating in particular multitenant environments based on the patterns identified in the single tenant environments.

The data analysis engine 232 may collect telemetry data from the data collection engine 240 and may map that information to particular components of network infrastructure. This may be done using the system information captured when recording the communication information and, as such, may be useable to identify which server(s) is aligned to particular application(s). In doing so, the data analysis engine 232 may generate an application graph to know timing information of communications, how much data was available with that communication, as shown in FIG. 5A. Here, directionality information may be shown, and data size and other metadata may also be available. This data may be captured continually, or periodically. In the illustrative example, snapshot data may be captured in hour increments. This hourly snapshot may then be transformed into a matrix view called an adjacency matrix that has all the nodes applications and/or servers may identify which applications are communicating. Directionality may be given by the graph, as communication may be asymmetric. This data collection may be repeated over time, as shown in FIG. 5B, which shows additional information captured over time, where a 3D matrix tensor object may be generated for a longer period of time to enable more accurate operation of the ML model. Within the three dimensional (3D) matrix tensor object shown in FIG. 5C, each two dimensional (2D) matrix represents telemetry data for a particular point in time (e.g. an hour of telemetry data). This 3D matrix tensor object is then used as the main input for the model where transforming of connections and mapping of the transformations of the communications into the 3D matrix. In some cases, the 3D matrix may be reshuffled and rearranged to align hour matrices into a multidimensional object that provides, for each day of the week and for each hour of that day, a pattern of communication detected over time.

FIG. 6 shows illustrative predicted likelihoods of dependency mapping of communications between applications according to aspects described herein. The ML model operation helps determine subsequent dependencies over multiple slices and/or snapshots of communication data. The model may be trained on the historical data and/or retrained on feedback from the system or one or more external systems, so that the model can forecast what the probabilities are for any given pair of applications to be communicating for a given point in time. In some cases, the model may provide information on intermediary steps within the application to application communication. In some cases, the likelihood matrix of FIG. 6 may show a likelihood of which communications may be communicating at a particular time period (e.g., at 8 AM). With this in mind, the system may predict which applications may be communicating and use that information to identify deviations from expected or otherwise normal operation. By extending this logic to multi-tenant applications, where a first application may operate on a sever and another application may also be operational on the same server. With this information, the pattern of probabilities, for each hour of time, may be used to identify patterns of probabilities of a connection between applications, which can be used to compute likelihood scores that may then be used to determine which application is most likely a target (or source) of communications to the multi-tenant server at that point in time. For example, each application may have a different pattern of operation, where the differing patterns may be used to differentiate between the different applications resident on the multitenant server.

This may be performed in a classification step (e.g., a binary classification task that happens at the end of processing). The classification step may use a pair-wise likelihood application test against any application on the multitenant server, based on that result, determine a final output forecast of likely edges on the next time step. As such, the output of the ML model is used for identifying a predicted communication likelihood between applications for the next time period. The results may be used to improve mappings and/or to assign a score associated with multitenant server applications. If the output is a determination of a high likelihood of communication between a source application and 2 different applications on the same multitenant server, a result may be a comparative likelihood between the applications on the server. The model may output an estimate of confidence of which application the communications may be associated In some cases, the multitenant dependency mapping system may, in cases where there is uncertainty, be used to give more confidence in data flow mapping and drive objectives to understand data movement between applications within the enterprise and to ultimately effectively identify anomalies that could cause or identify potential risk to the enterprise organization. The system may also be used to answer other data related questions that come up in terms of responses to policies and/or regulations, such as limiting cross border data movement, and the like. This model may continually train and evolve over time and as part of the ongoing monitoring the system may automatically evaluate performance over time and determine whether the model should be recalibrated. In some cases, other feedback (e.g., system generated feedback, human generated feedback), may be used to verify the predicted data flows really existed, or in lieu of a concrete data source, validate data flow information. This may be performed periodically (e.g., weekly, monthly, (quarterly), and the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a first sever hosting a first application;
a second server hosting a plurality of applications;
a multitenant application dependency mapping platform, comprising:
at least one processor; and
memory storing computer-readable instructions that, when executed by the at least one processor, cause the multitenant application dependency mapping platform to:
receive, from a network telemetry sensor monitoring an enterprise network, network communications information corresponding communications between a plurality of applications;
generate model input data based on the network communications information corresponding communications between the plurality of applications;
identify, by a machine learning model of a machine learning module and from the model input data, a dependency matrix corresponding to communications between the plurality of applications,
generate, based on the dependency matrix, a likelihood matrix corresponding to a probability of application communications to the second server being directed to each application of the plurality of applications; and
trigger, by an external computing system, an indication of improper activity corresponding to the probability of application communications to the second server is being directed to a second application of the plurality of applications.

2. The system of claim 1, wherein the instructions cause the multitenant application dependency mapping platform to generate an input matrix corresponding to application communication activity for each time period of a plurality of time periods.

3. The system of claim 2, wherein the time period is an hour.

4. The system of claim 2, wherein the plurality of time periods comprises one or more of a week, a month, and a year.

5. The system of claim 1, wherein the model input data comprises a three dimensional tensor matrix comprising a plurality of two dimensional representations of telemetry data for given time periods.

6. The system of claim 1, wherein the first server comprises a single tenant server.

7. The system of claim 1, wherein first server comprises a second multitenant server hosting a second plurality of applications.

8. The system of claim 1, wherein the instructions cause the multitenant application dependency mapping platform to communicate a report comprising a dependency map of applications active within the enterprise network.

9. The system of claim 1, wherein the instructions cause the multitenant application dependency mapping platform to train the machine learning model based on historical communication information between applications communicating over the enterprise network.

10. The system of claim 1, wherein the instructions cause the multitenant application dependency mapping platform to automatically and continuously retrain the machine learning model based on feedback received corresponding to accuracy of a dependency map of applications communicating on the enterprise network generated from output from the machine learning model.

11. The system of claim 1, wherein the instructions cause the multitenant application dependency mapping platform to generate a three dimensional tensor matrix for use as input to the machine learning model based on network telemetry information and application communications configuration information.

12. The system of claim 11, wherein the instructions cause the multitenant application dependency mapping platform to generate application communications configuration information based on input received via a user interface presented at user device.

13. A method comprising:
receive, from a network telemetry sensor monitoring an enterprise network, network communications information corresponding communications between a plurality of applications operational within the enterprise network, wherein at least one application of the plurality of applications is operational on a multitenant server;
generate model input data based on the network communications information corresponding communications between the plurality of applications;
identify, by a machine learning model of a machine learning module and from the model input data, a dependency matrix corresponding to communications between the plurality of applications,
generate, based on the dependency matrix, a likelihood matrix corresponding to a probability of application communications to a second server being directed to each application of the plurality of applications; and
trigger, by an external computing system, an indication of improper activity corresponding to the probability of application communications to a second server is being directed to a second application of the plurality of applications.

14. The method of claim 13, further comprising generating an input matrix corresponding to application communication activity for each time period of a plurality of time periods.

15. The method of claim 14, wherein the time period is an hour.

16. The method of claim 14, wherein the plurality of time periods comprises one or more of a week, a month, and a year.

17. The method of claim 13, wherein the model input data comprises a three dimensional tensor matrix comprising a plurality of two dimensional representations of telemetry data for given time periods.

18. Non-transitory computer readable media storing instructions that, when executed by a processor, cause a multitenant application dependency mapping platform to:
receive, from a network telemetry sensor monitoring an enterprise network, network communications information corresponding communications between a plurality of applications;
generate model input data based on the network communications information corresponding communications between the plurality of applications;
identify, by a machine learning model of a machine learning module and from the model input data, a dependency matrix corresponding to communications between the plurality of applications,
generate, based on the dependency matrix, a likelihood matrix corresponding to a probability of application communications to a second server being directed to each application of the plurality of applications; and
trigger, by an external computing system, an indication of improper activity corresponding to the probability of application communications to the second server being is being directed to a second application of the plurality of applications.

19. The non-transitory computer readable media of claim 18, wherein the instructions cause the multitenant application dependency mapping platform to generate a three dimensional tensor matrix for use as input to the machine learning model based on network telemetry information and application communications configuration information.

20. The non-transitory computer readable media of claim 19, wherein the instructions cause the multitenant application dependency mapping platform to generate application communications configuration information based on input received via a user interface presented at user device.

* * * * *